(No Model.)  8 Sheets—Sheet 1.

C. W. ARNOLD.
FRINGE MAKING MACHINE.

No. 451,440. Patented Apr. 28, 1891.

WITNESSES:
M. E. Hill
Jas. J. Maloney

INVENTOR
Clarence W. Arnold
BY
Jos. P. Livermore
ATTORNEY (No Model.) 8 Sheets—Sheet 2.
C. W. ARNOLD.
FRINGE MAKING MACHINE.

No. 451,440. Patented Apr. 28, 1891.

WITNESSES
Jas. J. Maloney.
M. E. Hill.

INVENTOR
Clarence W. Arnold
BY Jos. P. Livermore
ATTORNEY (No Model.) 8 Sheets—Sheet 3.
C. W. ARNOLD.
FRINGE MAKING MACHINE.

No. 451,440. Patented Apr. 28, 1891.

WITNESSES
M. E. Hill
Jas. J. Maloney

INVENTOR
Clarence W. Arnold
BY Jos. P. Livermore
ATTORNEY (No Model.) 8 Sheets—Sheet 4.
C. W. ARNOLD.
FRINGE MAKING MACHINE.

No. 451,440. Patented Apr. 28, 1891.

WITNESSES:
M. E. Hill
Jas. J. Maloney.

INVENTOR
Clarence W. Arnold
BY
Jos. P. Livermore
ATTORNEY (No Model.)　　　　C. W. ARNOLD.　　8 Sheets—Sheet 5.
FRINGE MAKING MACHINE.

No. 451,440.　　　　　　Patented Apr. 28, 1891.

WITNESSES
M. E. Hill.
Jas. J. Maloney.

INVENTOR
Clarence W. Arnold
By his Attorney
Jos. P. Livermore

(No Model.) 8 Sheets—Sheet 8.

C. W. ARNOLD.
FRINGE MAKING MACHINE.

No. 451,440. Patented Apr. 28, 1891.

WITNESSES:
M. C. Hill.
Jas. J. Maloney.

INVENTOR
Clarence W. Arnold
BY Jos. P. Livermore
ATTORNEY

UNITED STATES PATENT OFFICE.

CLARENCE W. ARNOLD, OF WORCESTER, MASSACHUSETTS, ASSIGNOR TO EDWIN BROWN, TRUSTEE, OF SAME PLACE.

FRINGE-MAKING MACHINE.

SPECIFICATION forming part of Letters Patent No. 451,440, dated April 28, 1891.

Application filed January 11, 1887. Serial No. 224,026. (No model.)

*To all whom it may concern:*

Be it known that I, CLARENCE W. ARNOLD, of Worcester, county of Worcester, State of Massachusetts, have invented an Improvement in Fringe-Making Machines, of which the following description, in connection with the accompanying drawings, is a specification, like letters on the drawings representing like parts.

My invention relates to a loom for weaving fringed fabrics, and is embodied in a loom for making a kind of knotted fringe in which the knot is formed by carrying the alternate picks of weft-thread wholly around a portion of the warp-threads. The fringed fabric produced by the loom has a number of warp-threads that form the head of the fringe, which will be called for distinction the "head" warp-threads, and a short distance below the head of the fringe is a series of warp-threads, which will be called for distinction the "knot" warp-threads, as they, in connection with the weft, form the knots that serve both to prevent the fringe from raveling and also to give it an ornamental appearance. The picks of filling-thread are drawn in from the selvage side of the fabric through the sheds by a hook and are then cut off in said hook to form the fringe, and in order to weave the knotted fringe described the head warp-threads and the knot warp-threads are controlled by different sets of harness-frames, a shed being formed in each set of warp-threads only twice for each three movements of the hook. In order to produce the fabric, the first movement of the hook draws a pick of weft-thread through an open shed in both sets of warp-threads. Then the shed in the head warp-threads is changed and another longer pick of weft-thread drawn in, passing through the same shed in the knotted warp-threads as the first-mentioned shorter pick. Then the last-mentioned pick is taken by a looping device and carried around the knot warp-threads, which then have their shed changed, while the head-shed remains unchanged, and the hook draws this pick through the new shed in the knot warp-threads. The second or knot pick has to be drawn longer than the pick which is not knotted, so as to bring the ends of the fringe even; and the invention consists, mainly, in the novel construction and arrangement of the harness-frames, lay, and weft-drawing hook, with their actuating mechanism and auxiliary devices by which the fabric is woven, as stated; and the invention further consists in various details of construction of the parts hereinafter pointed out, including warp and weft thread stop mechanism, by which the operation of the loom is stopped in case any of the warp or weft threads are broken or exhausted.

Figure 1 is a plan view of a loom embodying this invention; Figs. 2 and 3, sectional details to be referred to.

Figures 1, 2, 3:
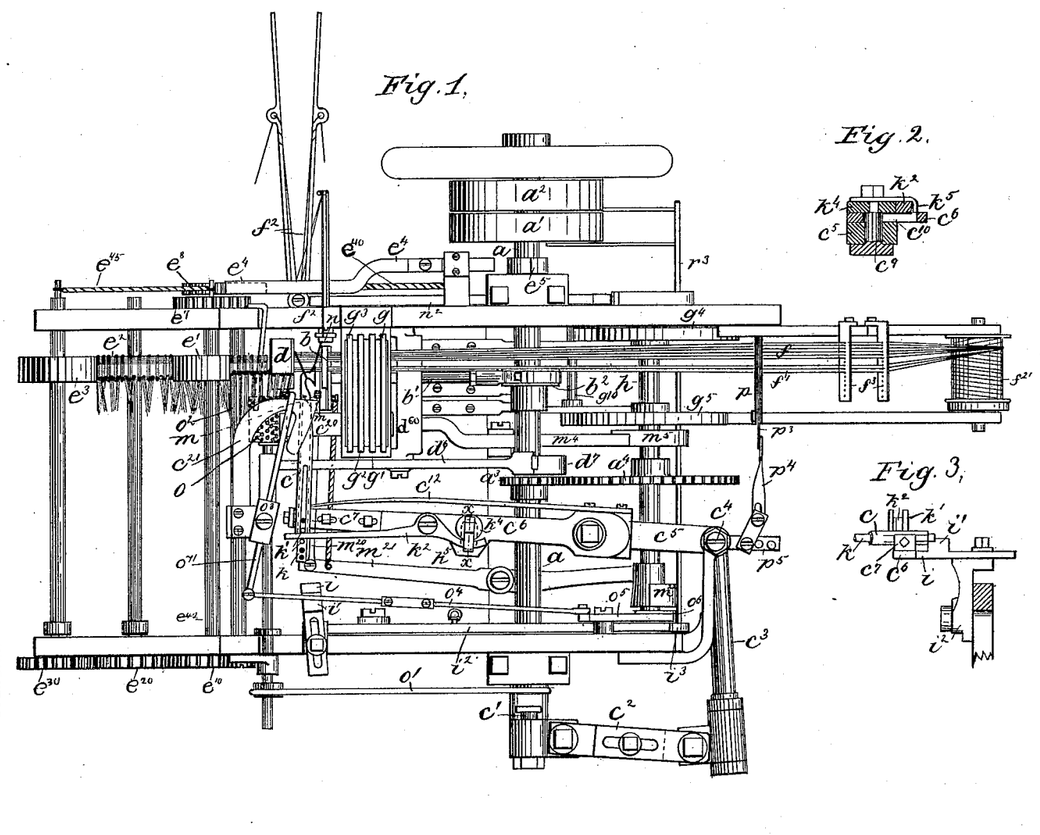
Figure 4:
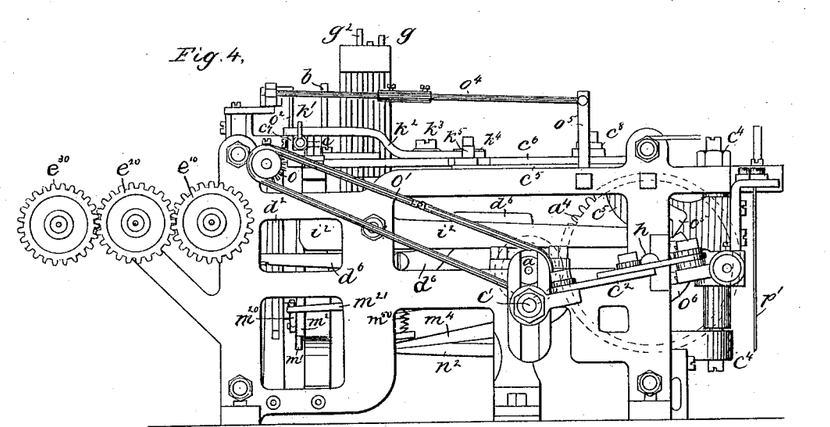
Fig. 4, a side elevation of the loom.

The main shaft $a$, provided with the usual fast and loose pulleys $a'$ $a^2$, actuates by suitable actuating mechanism the lay $b$, the hook $c$, that draws in the weft-thread, the temple $d$, and the take-up rollers $e$ $e'$ $e^2$ $e^3$, all of which parts make one movement at each rotation of the main shaft $a$, and which parts are shown in their proper relations to one another in Figs. 1 and 4, the trains of mechanism for actuating each being shown separately in the other figures, which will be referred to in describing the said actuating mechanism.

The warp-threads are divided into two groups $f\ f'$, as shown, the former constituting the head of the fringe and the latter the knot warp-threads, and each set is carried in a different pair of harness-frames $g\ g'\ g^2\ g^3$.

In the operation of the loom a fresh pick of filling-thread is taken twice only out of three movements of the hook $c$, and it requires three rotations of the shaft $a$ to constitute a cycle or complete set of operations, such set of operations being repeated during each three rotations of the said shaft, which is connected by gearing $a^3\ a^4$, arranged to give a speed of three to one with the shaft $h$, which latter thus makes one rotation at each three rotations of the shaft $a$, or one cycle of operations of the loom, and is provided with cams that actuate various of the parts of the loom.

The shaft $h$ is provided with cams $g^4\ g^5$, that operate the pairs $g\ g'$ and $g^2\ g^3$, respectively, of harness-frames, and thus form two sheds in each of the set $f\ f'$ of the warp-threads at each three movements of the shaft $a$ and hook $c$. For convenience the cycles of operations will be spoken of as beginning when the shed is open in both sets of warp-threads. The hooks $c$ then draws one loop of filling-thread through this open shed, after which the shed in the head warp-threads $f$ is changed, while that in the knot warp-threads $f'$ remains unchanged and a second loop of filling-thread is drawn through the new shed in the head-threads, but the same shed as the previous one in the knot warp-threads, after which the shed is changed in the knot warp-threads, but not in the head warp-threads, and at the next passage of the hook through the shed it receives no new filling-thread, but engages the pick of filling-thread that has previously been drawn into one shed of the knot warp-threads, and has then had the free end thereof returned beneath the knotting-warps and raised between the head-warps and knotting-warps, drawing such free end through the next shed in the knot warp-threads.

Figure 15:
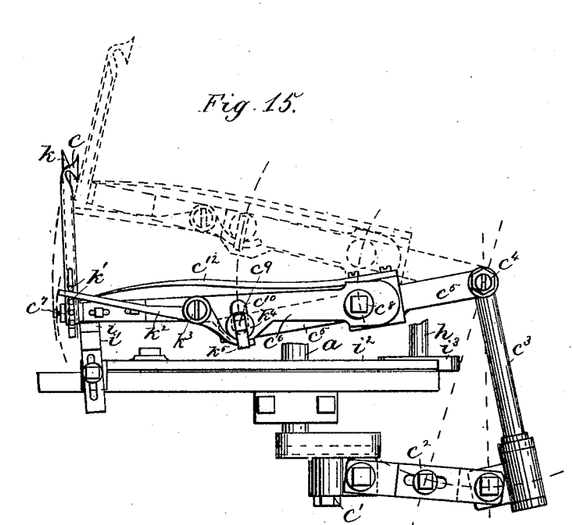
Figs. 15 and 16, a plan view and side elevation, respectively, of the weft-drawing hook and co-operating parts.
Figure 16:
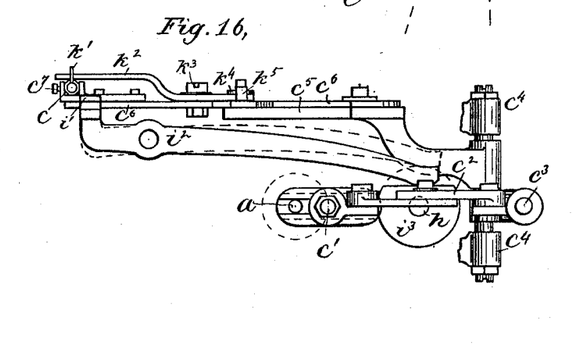

The actuating mechanism for the hook $c$ is best shown in Figs. 15 and 16, and consists of a crank-pin $c'$, connected with the main shaft $a$, and a link $c^2$, connected with the crank-pin and with one arm $c^3$ of a lever, pivoted at $c^4$, and having supported on its other arm $c^5$ an arm $c^6$, to the extremity of which the hook $c$ is securely fastened by a clamp $c^7$. The said arm $c^6$ is pivoted at $c^8$ upon the arm $c^5$ of the actuating-lever, which latter is provided with a stud $c^9$, passing through a slot $c^{10}$ in the arm $c^6$, said arm being acted upon by a spring $c^{12}$, connected with the arm $c^5$, and tending to hold the arm $c^6$ in the position shown in full lines, Fig. 1, and in dotted lines, Fig. 16, on the arm $c^5$ of the actuating-lever. This connection between the hook $c$ and its actuating-lever $c^3\ c^5$ permits the hook $c$ to move different distances from the head of the fringe, while the lever $c^3\ c^5$ always has the same amount of movement, and consequently the arm $c^6$ may be arrested when the hook has moved far enough to draw the desired length of filling-thread through the warp-thread, although the lever $c^3\ c^5$ may continue to move by the yielding of the spring $c^{12}$, the amount of additional movement thus permitted being limited only by the length of the slot $c^{10}$ in the arm $c^6$.

The hook $c$ is arrested at different points in its different movements by a stop $i\ i'$, the portion $i$ of which when in line with the arm $c^6$ causes the hook $c$ to have a shorter movement than when the portion $i'$ of the stop is in line with the arm $c^6$. The difference in length of movement permitted by the parts $i$ and $i'$ of the stop is equal to the length of filling-thread required to pass around the knot warp-threads $f'$ in making the knot.

The stop $i\ i'$ is supported at one end of a lever $i^2$, operated by a cam $i^3$ on the cam-shaft $h$, the said cam being properly shaped, as shown in Fig. 16, to hold the part $i$ of the stop up in line with the arm $c^6$ during one movement thereof, which is the first movement of the cycle and the one that draws the shorter pick of filling-thread through the shed of both sets $f\ f'$ of warp-threads, after which the stop $i\ i'$ is lowered, so that in the two succeeding movements the arm $c^6$ is arrested by the portion $i'$ of the stop at the end of a movement by which a longer pick of filling-thread is drawn through the second shed in the head warp-threads. The filling-thread is cut off after the hook has been stopped by the stop $i$ or $i'$ by means of a cutter $k$, inclosed in the shank of the hook, which is made tubular for this purpose.

Figures 5, 6:
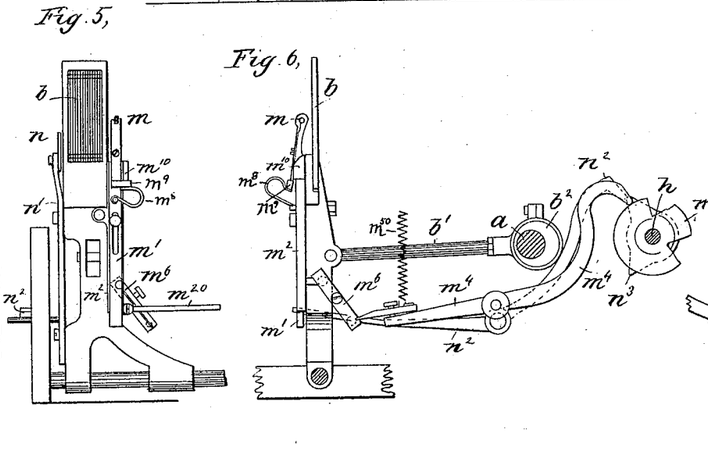
Fig. 5, a front elevation of the lay and parts connected therewith.
Figs. 6 and 7, side elevations thereof as seen from opposite sides of the loom.
Figure 8:
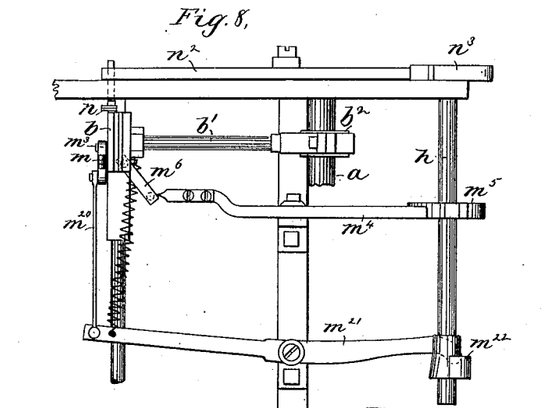
Fig. 8, a plan view of the lay and co-operating devices that loop the weft-thread around the knot warp-threads.
Figure 9:
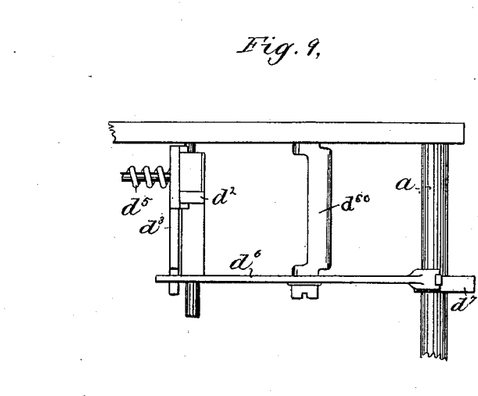
Fig. 9, a plan view of the temple or clamp that receives the woven fabric.
Figures 20, 21, 22:
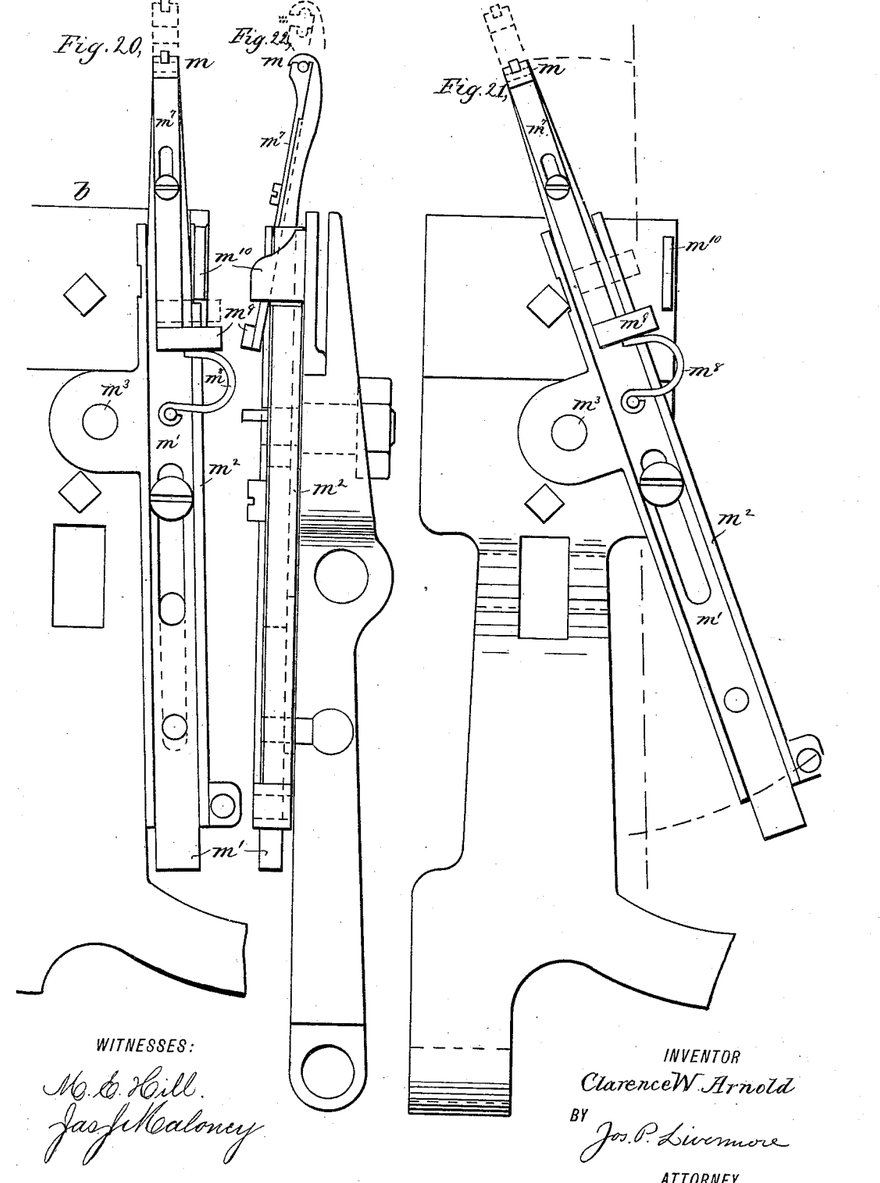
Figs. 20 and 21, front elevations in different positions of the looping device that carries the pick of weft-thread around the knot warp-threads in making the knot.
Fig. 22, a side elevation thereof, Figs. 20, 21, and 22 being on a larger scale than the other figures.
Figures 30, 33:
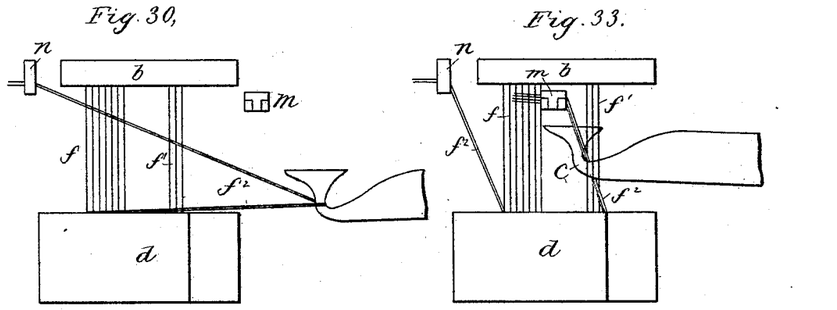

The shank of the cutter $k$ is provided with fingers $k'$, that receive one end of a lever $k^2$, pivoted at $k^3$ on the arm $c^6$, the other end of the said lever $k^2$ being acted upon by a washer $k^4$, connected by the stud $c^9$ with the arm $c^5$, so that as the latter arm continues its movement after the arm $c^6$ is arrested the lever $k^2$ is turned on its pivot and throws the cutter $k$ forward through the pick held in the hook $c$, as is clearly shown in Fig. 15. The construction of the arms $c^5$ and $c^6$ is shown in Fig. 2, which is an enlarged section on line $x\,x$, Fig. 1. A finger $k^5$, connected with the stud $c^9$, engages the lever $k^2$, so as to retract the cutter $k$ when the actuating-lever $c^5$ begins its forward movement. Thus through the co-operation of the stop $i\ i'$ and the cutter $k$ the hook $c$ at the first rotation of the shaft $a$ draws a group of filling-threads, which is cut off the length required for the fringe, and at the second movement another loop of filling-thread is drawn in, enough longer than the first to pass around the knot warp-threads $f'$ and then terminate even with the first or short pick, and then at the third movement of the hook $c$ the stop and cutter produce no effect, as the hook at this movement acts a second time on the long pick, which has been previously cut off. The second pick of filling-thread, immediately after it is drawn through the shed and cut off, is engaged by the looping device $m$, (best shown in Figs. 5, 6, 8, 20, 21, and 22,) the said device consisting of a holder made in two parts that surrounds and takes hold of the pick of thread, as will be best understood from Fig. 22. One member of the said holder is connected with a slide-bar $m'$, that works in a guide-lever $m^2$, pivoted at $m^3$ on the frame of the lay $b$, which is actuated by an eccentric-rod $b'$ and eccentric $b^2$ (see Fig. 6) on the main shaft $a$ in the usual manner. The looper $m$ thus moves forward and back at each movement of the lay, and the slide-rod $m'$ is moved longitudinally in the lever $m^2$ by means of a lever $m^4$, (see Fig. 6,) acted upon by a cam $m^5$ on the shaft $h$, and connected at its other end by a link $m^6$ with the slide-bar $m'$, the said link having ball-and-socket connections at either end to accommodate the various movements required. The lever $m^4$ is shown in this instance as held against the surface of the cam $m^5$ by a spring $m^{50}$, (see Fig. 6,) connected at one end with said lever $m^4$ and at its other end with the bracket $d^{60}$, (see Figs. 1 and 9,) on which the temple-jaw-operating lever $d^6$ is pivoted. The holding portion of the looper is held the greater portion of the time by the full part of the cam $m^5$ below the level of the hook $c$ and filling-thread, remaining in this position while the short and long picks are being drawn in by the hook, and just at the end of the latter movement the looper $m$ rises, as shown in dotted lines, Fig. 22, to the level of the pick of thread, the lever $m^4$ then entering one recess of the cam $m^5$. The other member of the looper-holder is connected with a slide $m^7$, working on the slide-bar $m'$ and normally pressed up by a spring $m^8$ to close the members of the holder together. When the slide $m'$ is raised, while in the position shown in Figs. 1, 5, and 20, at the opposite side of the knot warp-threads $f'$ from the head warp-threads $f$, a projection $m^9$ on the slide $m^7$ engages a projection $m^{10}$ on the lay-frame, as shown in Fig. 20, so that when the slide $m'$ and member of the holder forming a part of it is raised the other member of the holder will be held down and the holder thus opened, as shown in dotted lines, Fig. 22, the opening being just in line with the pick of weft-thread that extends across to the hook $c$, and as the lay moves forward the clamp will pass over the pick of weft-thread, as will be clearly understood from Fig. 22. The slide $m'$ then immediately begins to move down, closing the holder about the weft-thread, and the lever $m^2$ is then turned from the position shown in Fig. 20 to that shown in Fig. 21 by means of a link $m^{20}$, (see Figs. 5 and 8,) connected with a lever $m^{21}$, actuated by a cam $m^{22}$ on the shaft $h$. This movement of the looper-carrying lever $m^2$ brings the end of the clamp beneath the space between the head warp-threads $f$ and knot warp-threads $f'$, as will be understood from Figs. 31 and 32, and then, as the lay begins its forward movement, the slide $m'$ is again moved up by the lever $m^4$ entering a second depression in the cam $m^5$, as shown in dotted lines, Fig. 21, and in this upward movement the projection $m^9$ of the lower member of the holder does not engage the projection $m^{10}$, so that the holder moves up without opening, and then by the upward movement of the holder and forward movement of the lay, which takes place as the hook $c$ moves out from the shed, the pick is again carried into the hook $c$, as shown in Fig. 33, and drawn through the second time, it being understood that the shed in the knot warp-threads $f'$ has been changed by the action of the cam $g^5$ between the two movements of the needle by which the long pick was first drawn through the shed, and was then drawn through the shed a second time, after being carried around below the knot warp-threads by the looper, as just described.

Figure 7:
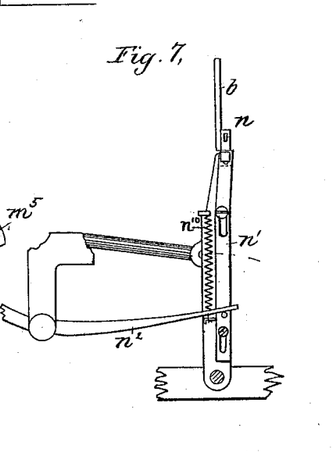

The holder or looper $m$ does not press upon the pick of thread, but merely encircles and holds it, and the hook $c$, in making its last movement, draws the thread out from between the jaws of the holder. The said needle is embraced above and below by spring-plates $c^{20}$ $c^{21}$, (see Figs. 1 and 13,) which give a proper tension to the thread and hold it after it has been cut, so that the looper $m$ can readily receive the filling-threads $f^2$. (See Fig. 1.) The filling-threads $f^2$, taken from balls at the side of the loom, are guided into the hook $c$ by a guide $n$, (see Figs. 5 and 7,) connected with a slide-bar $n'$, working on the opposite side of the lay from the clamp and moving forward and backward with the lay, and being moved up and down on the lay by a lever $n^2$, (see Figs. 6 and 7,) operated by a cam $n^3$ on the shaft $h$. The projecting portions of the said cam $n^3$ produce the downward movement of the guide $n$, by which the filling-thread is laid into the hook, it being moved in the opposite direction by a spring $n^{10}$, (see Fig. 7,) which keeps the end of the lever $n^2$ against the surface of its actuating-cam $n^3$, and it will be noticed that there are but two projections on the said cam a third of the circumference apart, so that the filling is laid into the hook only during two revolutions of the shaft $a$ out of every three, the third revolution being the one in which the long pick of filling-thread is drawn the second time through the knot warp-threads, at which time the shed in the head warp-threads is not changed and no additional thread is taken by the hook.

Figures 10, 11:
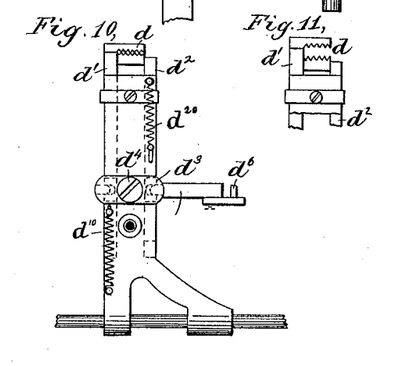
Figs. 10 and 11, front elevations thereof in different positions.
Figure 12:
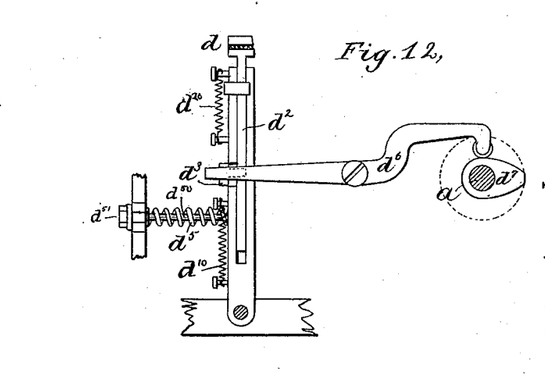
Fig. 12, a side elevation thereof.
Figure 13:
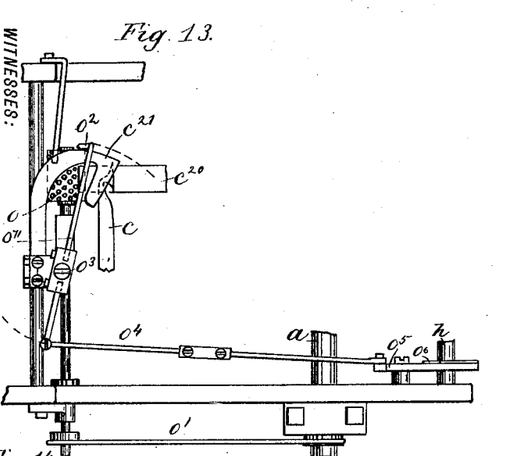
Figs. 13 and 14, a plan view and side elevation, respectively, of the devices by which the fringe-threads are carried forward out of the way of the operative parts of the loom.
Figure 14:
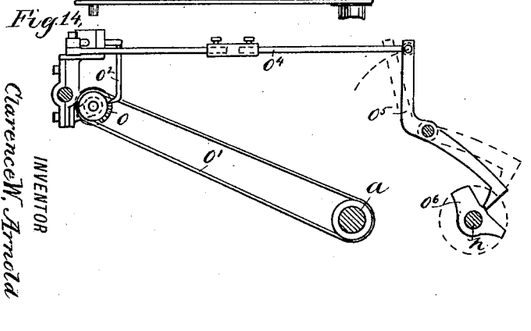

In order that the filling-threads that have been already woven in may be moved out of the way of the looper $m$, so that it will engage only the long pick intended for it, the loom is provided with a rotating brush $o$, Figs. 13 and 14, driven by a belt $o'$ from the main shaft $a$, the said brush lying under the friction-piece $c^{21}$, that bears on the thread in the hook, as before mentioned. The short pick of thread as soon as cut off is swept into the space between the brush $o$ and plate $c^{21}$ by the fingers $o^2$, on a lever $o^{71}$, pivoted at $o^3$ and connected by a link $o^4$ with a lever $o^5$, operated by a cam $o^6$ on the shaft $h$. This cam is also constructed to produce only two movements of the finger $o^2$ during three movements of the hook $c$, the said finger remaining stationary when the long pick is pulled in the first time, thus leaving the said pick in position to be engaged by the looper $m$; but after this pick has been drawn through the second time it also is carried forward by the finger $o^2$ and brush $o$ out of the way of the operative parts. The temple $d$ (best shown in Figs. 9, 10, 11, and 12) consists of two jaws connected with slide-bars $d'$ $d^2$, both engaged, as shown, by a lever $d^3$, pivoted at $d^4$ on the temple-standard, whereby when the long projecting arm of said lever $d^3$ is acted upon and turned downward from the position shown in Fig. 10 the jaws will be separated, as shown in Fig. 11, this action taking place when the temple is moved by its spring $d^5$, when the lay begins to move back after its beating-up movement. The slide-bars $d'$ $d^2$ are acted upon by springs $d^{10}$ $d^{20}$, (see Figs. 10 and 12,) tending to close the jaws upon the fabric, except when separated by the downward movement of the lever $d^3$, which is operated by a lever $d^6$, actuated by a cam $d^7$ on the main shaft $a$, and the temple-standard is engaged and moved forward by the lay as each pick is beaten up, the clamp-jaws being then closed, the spring $d^5$ permitting such forward movement which draws the fabric an amount equal to the increase in length made by the pick of filling-thread that is thus beaten up. The spring $d^5$ surrounds a rod $d^{50}$, connected at one end with the temple-standard, and having its other end passed through a stationary part of the frame, as shown in Fig. 12, and provided with a nut or projection $d^{51}$, which constitutes a stop for the return movement of the temple-standard produced by the spring $d^5$ when the lay moves back. The temple-jaws, as before stated, are open in this return movement, which brings them over the pick just beaten up, and upon which they close as soon as the return movement of the temple is ended, and thus hold the fabric while the next shed in the warp-thread is being opened. The take-up rollers $e'$ $e^2$ $e^3$, mounted on shafts connected by gears $e^{10}$ $e^{20}$ $e^{30}$, (see Figs. 1 and 4,) are actuated by a slide-bar $e^4$, (see Fig. 1) provided with a dog engaging the teeth of a ratchet-wheel $e^8$ on a shaft connected by two gears $e^7$ (see Fig. 1) with the shaft of the roller $e'$, which thus turns in the opposite direction from said ratchet-wheel, the fabric passing beneath the said roller $e'$ and then over the roller $e^2$, as clearly shown in Fig. 1.

The said slide-bar $e^4$ is actuated by a cam $e^5$ on the main shaft $a$ in the usual manner, being moved in the reverse direction by a spring $e^{40}$. (See Fig. 1.) A spring $e^{45}$ draws the shafts of the rollers $e'$ $e^3$ toward one another, so as to press the rollers $e'$ $e^3$ against the fabric between them and the roller $e^2$.

Figure 17:
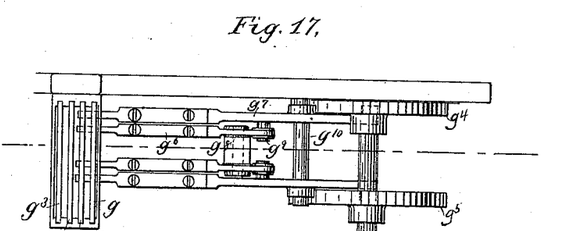
Fig. 17, a plan view, and Figs. 18 and 19, elevations in different positions, of the harness mechanism.
Figure 18:
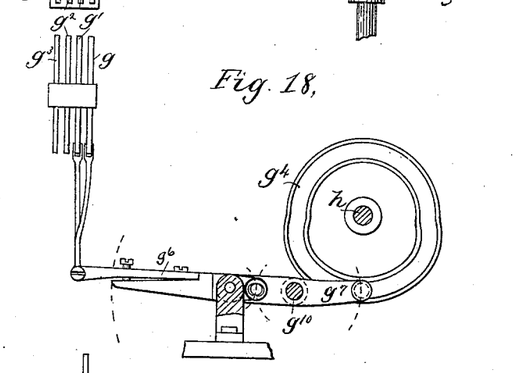
Figure 19:
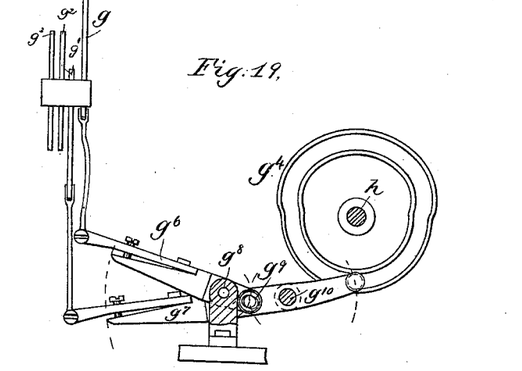

The pairs of harness-frames (see Figs. 17, 18, and 19) are each connected with two levers $g^6$ $g^7$, the former pivoted at $g^8$ and engaged by a stud $g^9$ on the lever $g^7$, which is pivoted at $g^{10}$ and acted upon by the cam $g^4$. Thus one cam moves a pair of harness-frames, as will be readily understood from Fig. 19. The two cams are properly shaped and arranged on the shaft $h$ to change the shed in each set of warp-threads $f$ and $f'$ at the proper times. The said warp-threads pass from the beam or support $f^{21}$ through suitable guides $f^3$, Fig. 1, and then over a device (best shown in Figs. 26 and 27) consisting of a U-shaped or channeled piece of metal $p$, supported on an arm $p'$, normally held in the full-line position, Fig. 27, by a spring $p^2$.

Figure 23:
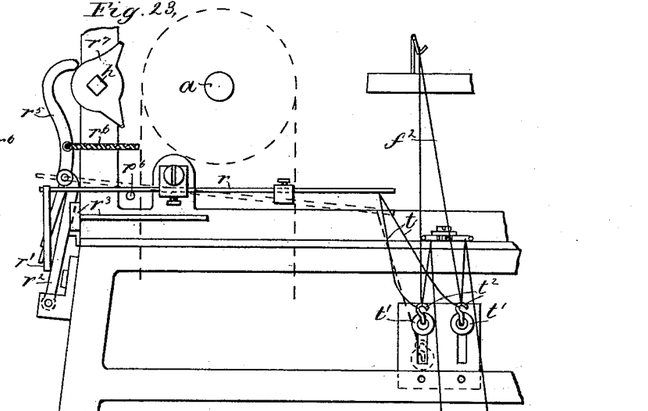
Figs. 23 and 24, side elevations of the weft-thread stop-motion in different positions.
Figure 24:
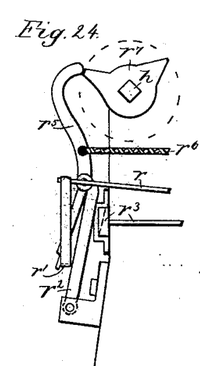
Figures 25, 26, 27:
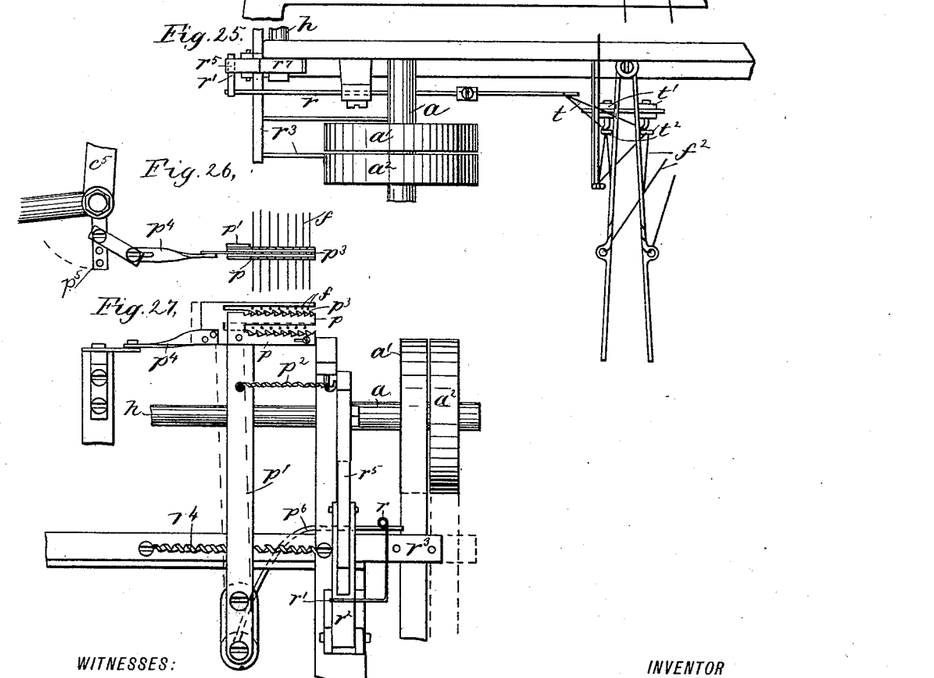
Fig. 25, a plan view of a portion thereof.
Figs. 26 and 27, a plan view and end elevation of the warp-thread stop-motion.

In order to prevent undue spreading of the warp-threads as they pass through this device, it is made in two parts, one above the other, as shown in Fig. 27, said parts being substantial duplicates of one another and each co-operating with about one-half of the warp-threads. Each of the parts of the said piece $p$ is provided with inclined teeth or serrations and also contains a slide-bar $p^3$, having oppositely-inclined serrations, which slide-bar is connected by a link $p^4$ with an arm $p^5$ of the hook-actuating lever $c^3$ $c^5$, (see Fig. 1,) so that the said slide $p^3$ moves backward and forward in the channeled piece $p$ at each rotation of the main shaft of the loom. This movement produces no effect as long as the warp-threads are retained by their tension above the tops of the teeth in the pieces $p$ $p^3$, as shown in Fig. 27; but when any one of the threads drops it will be caught between two of the oppositely-inclined teeth, and at the next movement of the part $p^3$ from the full to the dotted line position, Fig. 27, the thread will cause the arm $p'$ to be moved against the stress of the spring $p^2$. The arm $p'$ is provided with a finger $p^6$, that normally stands just under a lightly-balanced lever $r$, (see Fig. 23,) provided at its end with a projection $r'$, which, when the said lever is in its normal position, as shown in Fig. 23, rests against a latch-piece $r^2$, that engages a notch in the side of the shipper $r^3$, retaining the said shipper in position to hold the belt on the fast pulley $a'$. A spring $r^4$, Fig. 27, tends to move the shipper in the direction to carry the belt on the loose pulley $a^2$. The said shipper-latch $r^2$ has pivoted upon it a lever $r^5$, (best shown in Fig. 23,) acted upon by a spring $r^6$, that holds the end of the lever $r^5$ in engagement with a cam $r^7$ on the cam-shaft $h$, the said spring also keeping the shipper-latch $r^2$ in engagement with the shipper, as will be understood from Fig. 23. There is sufficient space between the lower arm of the lever $r^5$ and the shipper-holder $r^2$ to permit the said lever $r^5$ to turn on its pivot when acted upon by the cam $r^7$ without moving the said shipper-holder $r^2$; but if the projection $r'$ is raised, as shown in Fig. 24, it prevents the movement of the lever $r^5$ on its fulcrum at the upper end of the holder $r^2$ and makes the said holder and lever in effect a single rigid lever, which has to turn on the pivot at the lower end of the holder $r^2$, as shown in Fig. 24, thus carrying the said holder out from the notch in the shipper and permitting the latter to be moved by its spring $r^4$, so as to carry the belt on the loose pulley, and thus stop the loom. The lever $r$ is also operated to stop the loom in the manner just described by the breaking of the weft or filling thread by the devices shown in Figs. 23 and 25. The said lever $r$ is connected by threads or other flexible connectors $t$ with a series of weights $t'$, any one of which is sufficient to overbalance the lever $r$ and raise the finger $r'$, as shown in dotted lines, Fig. 23. The said weights $t'$ are provided with hooks $t^2$, through which the weft-threads $f^2$ pass, and when the said weft-threads are under proper tension they will support the weights $t'$, so that the lever $r$ is not affected by them; but if one of the weft-threads breaks or is exhausted the corresponding weight $t'$ will drop, as shown in dotted lines in Fig. 23, and thus move the lever $r$ and cause the loom to stop.

It is apparent that the operation of the stop-motion device which I have described is not dependent on the peculiar movements of the weft-drawing hook and devices for weaving the knotted fringe herein described, but would be equally applicable to a loom in which the hook or needle takes thread at each movement, or, in other words, weaves plain fringe, and the means employed for cutting the weft-thread in the hook might be used independently of the looping device in a loom for making plain fringe.

That part of the invention which relates to the special device forming the knotted fringe, consisting, mainly, in the hook and the looper and their actuating mechanism is not limited to use in connection with the special devices shown for controlling the position of the warp-threads—that is, the harness-frames and their actuating devices constituting the shedding mechanism—nor with the lay and temple or clamp shown, all of which are well-known operative parts of a loom and may be constructed and actuated in any suitable or usual manner.

Figure 28:
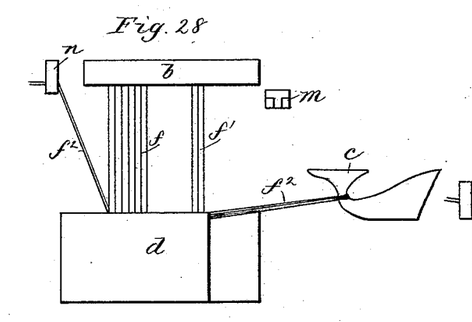
Figs. 28 to 33, diagrams representing the different steps in the formation of the fabric.
Figure 29:
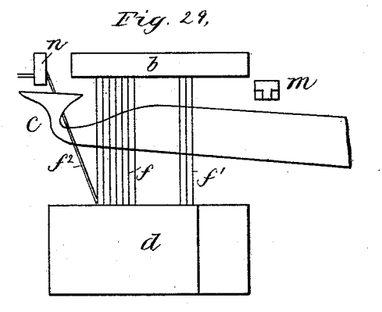
Figure 31:
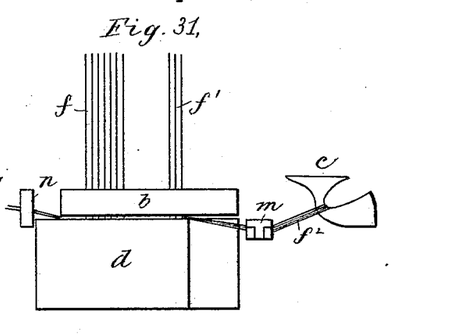
Figure 32:
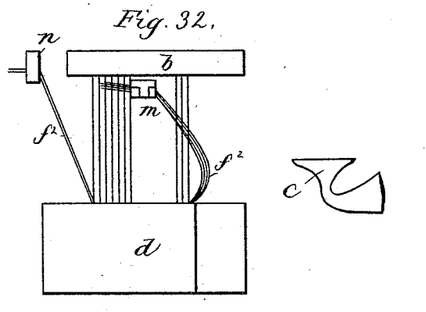

The operation of weaving the knotted fringe may be briefly described in connection with Figs. 28 to 33, as follows: In Fig. 28 the hook $c$ is shown as having just drawn through a short pick of the filling-thread $f^2$, the looper $m$ at this time not operating. In Fig. 29 the hook $c$ has just been projected through the shed, which has been changed from the position shown in Fig. 28, in the head-warp threads $f$, but not in the knot-warp threads $f'$, and the thread-guide $n$ has moved downward, and thus laid the thread into the hook $c$, as shown. The said hook then draws a longer pick of filling-thread through the shed, as shown in Fig. 30, and as this pick is beaten up by the lay, as shown in Fig. 31, the looper $m$ seizes the free end just before it is cut off in the hook, and then as the lay moves back, as shown in Fig. 32, the looper $m$ moves downward and laterally, so as to carry the free end of the tuft of filling-thread held by it below the knot-warps $f'$, and then to the space between the knot and head warps. During this movement of the lay the shed is changed in the knot-warps $f'$, but not in the head-warps, and the hook $c$ is then carried forward through the shed again; but at this movement the thread-guide $n$ does not move down and lay the weft-thread extending down from it to the fabric into the hook, but the looper $m$ moves up, so that the hook $c$ on its return movement engages the free end of the tuft of weft-thread and draws it out from the looper $m$ and through the shed last formed in the knot warp-threads $f'$, this completing a cycle in the operation of the loom, comprising three movements of the hook $c$ and of the lay by which two picks of the fringe fabric are woven and one of said picks carried around a portion of the warp-threads.

I claim—

1. The combination of the warp-controlling mechanism of a loom with a hook and actuating mechanism by which it is carried back and forth through the shed, a weft-thread guide that places the weft-thread in the said hook, and a cutter by which the weft-thread is cut in said hook after being drawn through the shed thereby, substantially as described.

2. The combination of the weft-drawing hook with an actuating-lever, an arm pivoted on said lever and connected with the said hook, and a stop that arrests the said arm and hook in the movement of the lever, substantially as described.

3. The combination of the hook and cutter movable therein with an actuating-lever for said hook, an arm pivoted to said lever and connected to the hook, a stop therefor, a cutter-actuating lever pivoted on said arm, and means for operating said cutter-lever, substantially as and for the purpose described.

4. The combination, with the shedding mechanism, of a weft-drawing hook and cutter by which the weft-thread is drawn through the shed and cut-off, a rotating brush and co-operating finger by which the weft-thread is carried forward from the hook, and means for actuating the said hook, cutter, brush, and finger, substantially as described.

5. The combination, in a loom, of mechanism for shedding the heading-warps and knot-warps, a weft-drawing hook, mechanism for operating said hook in a manner substantially as described, with a looper engaging with the weft-thread after it is drawn through the shed and passing it around the knot-warps to be again drawn by the hook, and mechanism for operating said looper, substantially as set forth.

6. The combination, in a loom, of the mechanism for shedding the heading-warps and knot-warps, a weft-drawing hook, mechanism for operating the same, a looper engaging with the warp-thread and passing it around the knot-warp, substantially as described, mechanism for operating said looper with a stop for the hook, and devices by which the stop is moved to allow the hook to draw the weft-thread that is passed around the knot-warp to the same length as the straight weft-threads, substantially as described.

7. The combination, with the lay, of a looping device consisting of a thread-holding clamp or jaws, a guide-lever pivoted on the said lay, in which one member or jaw of the said clamp is longitudinally movable, and actuating mechanism, substantially as described, by which the said looper is moved up and down and its guide-lever turned on its pivot, substantially as described.

8. The combination of the lay, the looper, and its guide-lever, said looper consisting of a thread-holder comprising two members, one of which is longitudinally movable in said guide-lever and the other of which is longitudinally movable on the first member, a projection on the lay co-operating with one of said members, and a spring tending to close said members together, and means for operating the said parts, substantially as described.

9. The combination of the thread-drawing hook with friction-plates embracing the same, a revolving brush, a vibrating finger by which the threads are taken from said hook to the surface of the said brush, and means for revolving the brush and vibrating the finger, substantially as described.

10. The combination of the shipper and its latch $r^2$ with a lever $r^5$, pivoted on said latch, an actuating-cam for said lever, and the projection $r'$, co-operating with the said latch, substantially as described.

11. The combination of the shipper and its latch with a latch-operating lever and cam, and the device $r\ r'$, by which the said lever is made to operate the said latch, and the weight $t'$, connected with the device $r$, as described, and operated by the filling-threads, substantially as described.

12. The combination of the temple-jaws with the slide-bars $d'\ d^2$ and their actuating-lever $d^3$ and means for operating said parts, substantially as described.

13. The combination of the main shaft and cam-shaft $h$, driven thereby at one-third the speed of said main shaft, warp-shedding mechanism, a lay and weft-drawing hook and connecting mechanism, substantially as described, between them and the main shaft, and the weft-thread guide $n$ and looper $m$ and connecting mechanism, substantially as described, between them and the cam-shaft $h$, substantially as described.

14. The combination of the weft-drawing hook $c$, weft-thread guide $n$, and weft-looper $m$, and means for operating said parts, substantially as described.

In testimony whereof I have signed my name to this specification in the presence of two subscribing witnesses.

CLARENCE W. ARNOLD.

Witnesses:
HENRY E. HILL,
EDWIN BROWN.